(12) United States Patent
Takaya et al.

(10) Patent No.: US 10,459,692 B2
(45) Date of Patent: Oct. 29, 2019

(54) RANDOM NUMBER GENERATOR

(71) Applicant: Kabushiki Kaisha Toshiba, Minato-ku (JP)

(72) Inventors: Satoshi Takaya, Kawasaki (JP); Shinichi Yasuda, Tokyo (JP); Tetsufumi Tanamoto, Kawasaki (JP); Shinobu Fujita, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 285 days.

(21) Appl. No.: 15/263,972

(22) Filed: Sep. 13, 2016

(65) Prior Publication Data
US 2017/0269904 A1    Sep. 21, 2017

(30) Foreign Application Priority Data

Mar. 16, 2016 (JP) .................. 2016-052320

(51) Int. Cl.
*G06F 21/72* (2013.01)
*G06F 7/58* (2006.01)
*H03K 3/03* (2006.01)
*H04L 9/08* (2006.01)
*H03K 3/84* (2006.01)

(52) U.S. Cl.
CPC .............. *G06F 7/588* (2013.01); *G06F 21/72* (2013.01); *H03K 3/0315* (2013.01); *H03K 3/84* (2013.01); *H04L 9/0869* (2013.01); *H04L 2209/08* (2013.01)

(58) Field of Classification Search
CPC combination set(s) only.
See application file for complete search history.

(56) References Cited

U.S. PATENT DOCUMENTS

| 5,937,024 A | 8/1999 | Nozaki |
| 8,341,201 B2 | 12/2012 | Vasyltsov et al. |
| 2003/0037079 A1* | 2/2003 | Wilber ............... G06F 7/588 708/250 |
| 2004/0213407 A1 | 10/2004 | Fujita et al. |

(Continued)

FOREIGN PATENT DOCUMENTS

| JP | 10-303738 A | 11/1998 |
| JP | 2000-259784 A | 9/2000 |

(Continued)

OTHER PUBLICATIONS

Sanu K. Mathew, et al., "2.4 Gbps, 7 mW All-Digital PVT-Variation Tolerant True Random Number Generator for 45 nm CMOS High-Performance Microprocessors", IEEE Journal of Solid-State Circuits, vol. 47, No. 11, Nov. 2012, pp. 2807-2821.

*Primary Examiner* — Harunur Rashid
(74) *Attorney, Agent, or Firm* — Oblon, McClelland, Maier & Neustadt, L.L.P.

(57) ABSTRACT

According to one embodiment, a random number generator includes a first circuit which outputs a second oscillation signal having a predetermined duty ratio on the basis of a first oscillation signal, a second circuit which latches values on the basis of the second oscillation signal and a clock having a frequency lower than a frequency of the second oscillation signal, a third circuit which outputs a control signal on the basis of the values, and a fourth circuit which controls the first circuit on the basis of the control signal.

16 Claims, 17 Drawing Sheets

(56) References Cited

U.S. PATENT DOCUMENTS

| | | |
|---|---|---|
| 2005/0007171 A1 | 1/2005 | Yoneda |
| 2005/0111852 A1* | 5/2005 | Mahgerefteh .......... G02B 5/281 |
| | | 398/187 |
| 2009/0106339 A1* | 4/2009 | Vasyltsov ............... G06F 7/588 |
| | | 708/251 |
| 2010/0106757 A1 | 4/2010 | Matthews et al. |
| 2012/0221616 A1 | 8/2012 | Yasuda et al. |

FOREIGN PATENT DOCUMENTS

| | | | |
|---|---|---|---|
| JP | 2005174206 A | * | 12/2003 |
| JP | 2004-234153 A | | 8/2004 |
| JP | 2005-33089 A | | 2/2005 |
| JP | 2005-174206 A | | 6/2005 |
| JP | 2008-176698 A | | 7/2008 |
| JP | 5074359 B2 | * | 11/2008 |
| JP | 2010-117846 A | | 5/2010 |
| JP | 2012-48614 A | | 3/2012 |
| JP | 5074359 B2 | | 11/2012 |
| WO | WO 2011/039846 A1 | | 4/2011 |

* cited by examiner

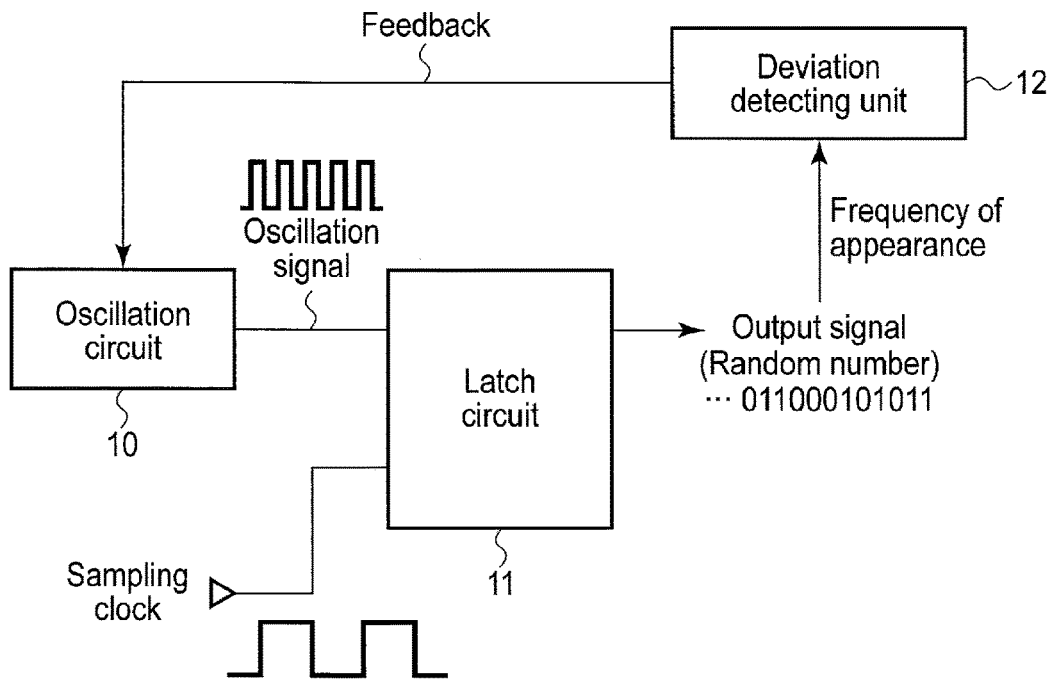
F I G. 1
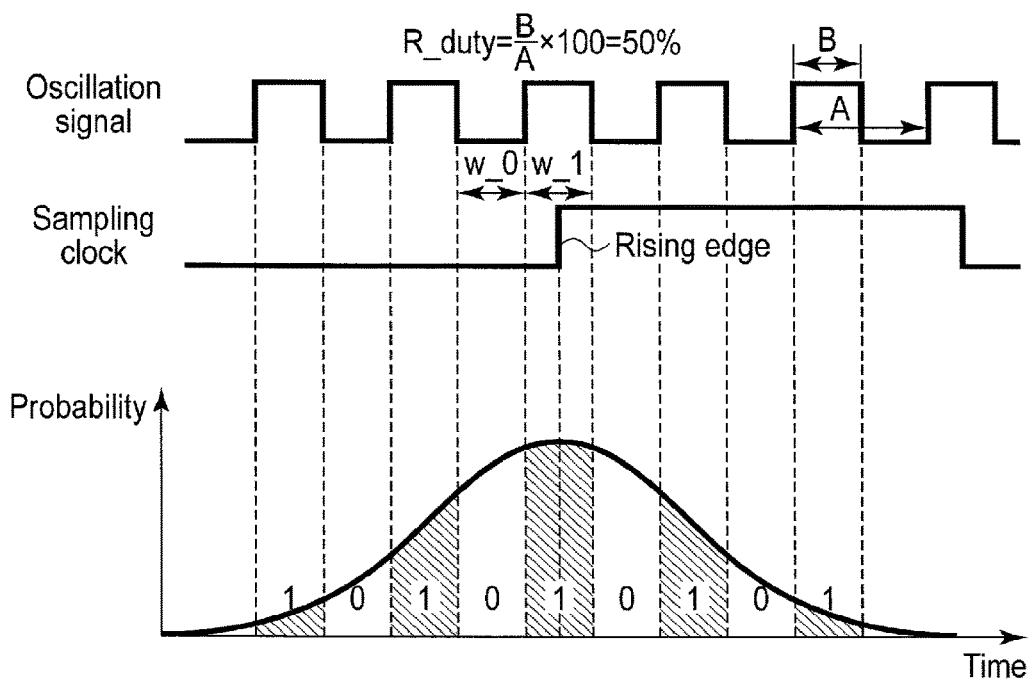
F I G. 2

| Frequency of appearance | Duty ratio of oscillation signal | Process |
|---|---|---|
| f_0 > f_1<br>(Number of 0 is more than number of 1) | R_duty < 50% | Duty ratio of oscillation signal is increased |
| f_0 = f_1 | R_duty = 50% | Stay |
| f_0 < f_1<br>(Number of 1 is more than number of 0) | R_duty > 50% | Duty ratio of oscillation signal is decreased |
F I G. 3
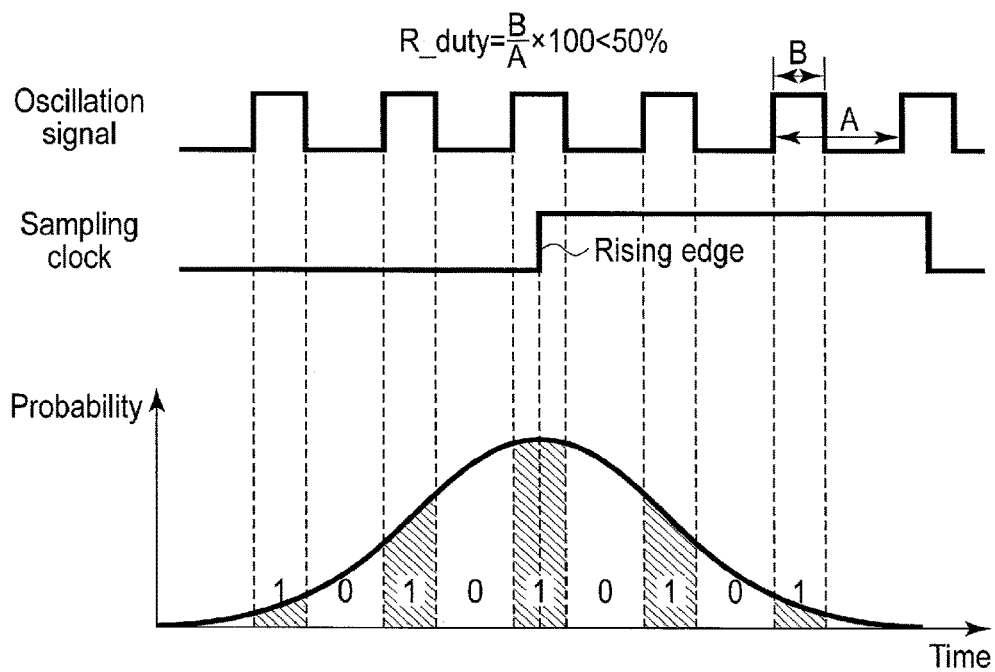
F I G. 4

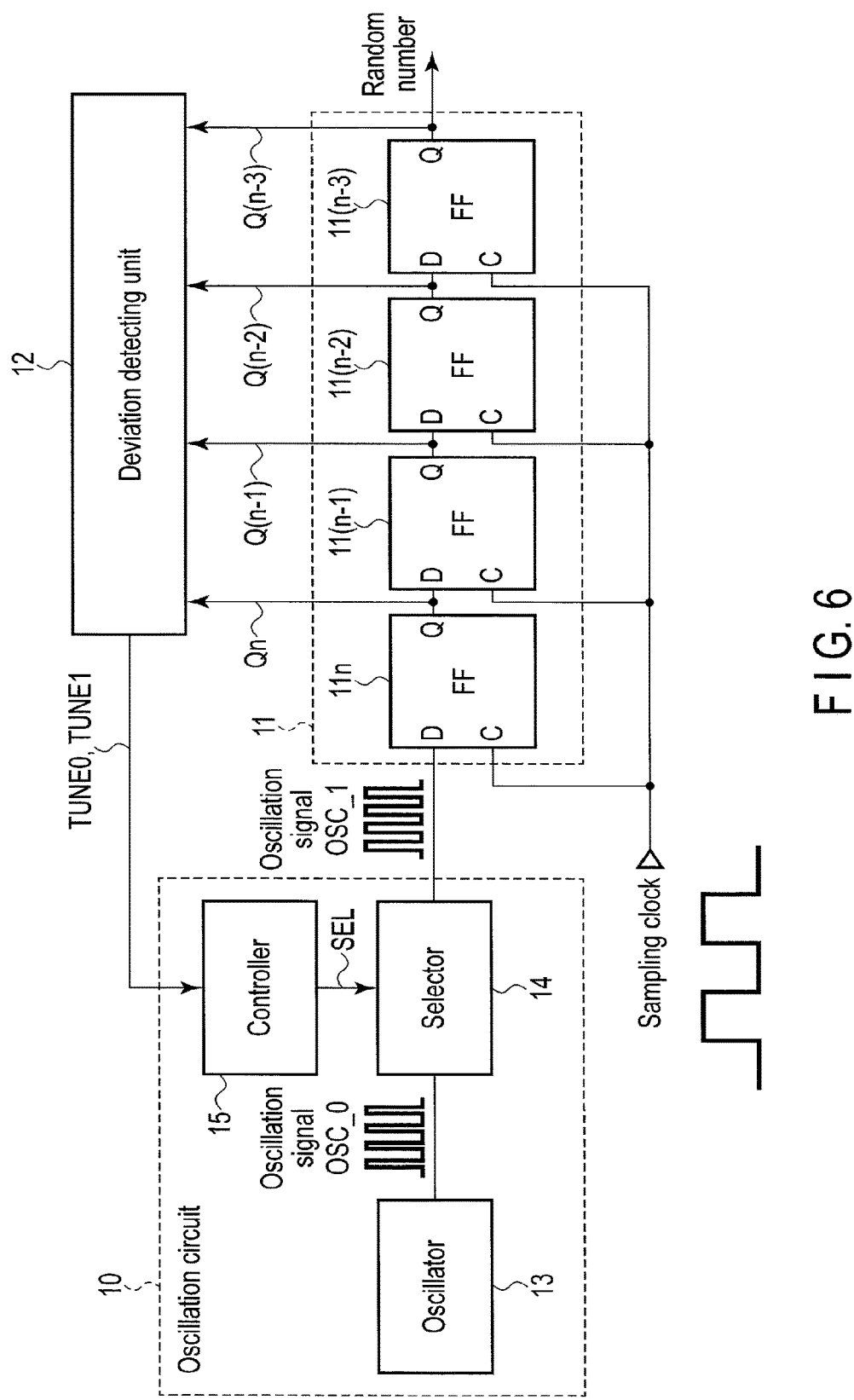
F I G. 6

| SEL [1:0] | Signal path | Duty ratio (Increase and decrease) |
|---|---|---|
| 00 | 2-input NAND-gate circuit | +5% |
| 01 | Inverter circuit | ±0% |
| 10 | 2-input NOR-gate circuit | −5% |
| 11 | (Nonuse) | (Nonuse) |

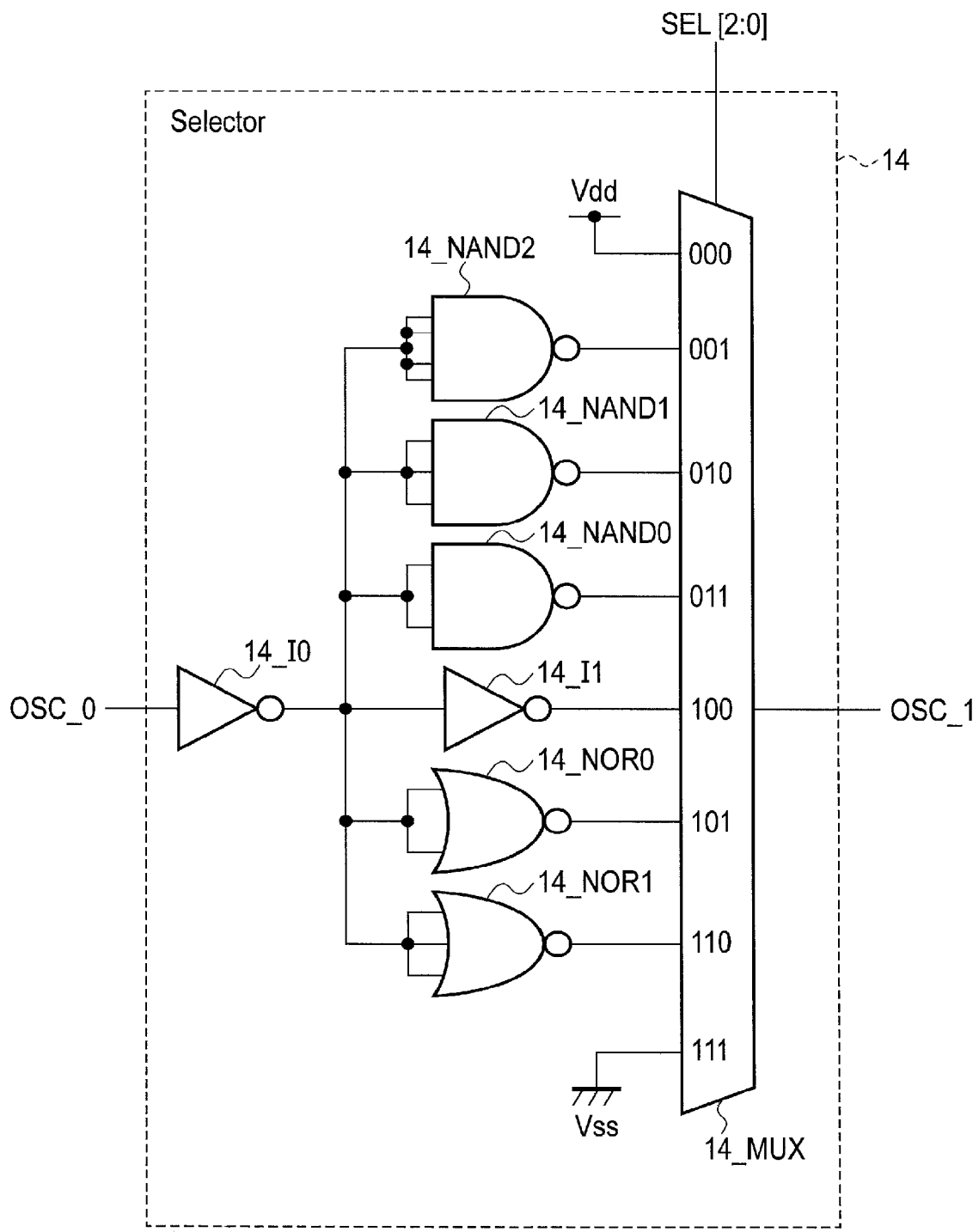
F I G. 10

| SEL [2:0] | Signal path | Duty ratio (Increase and decrease) |
| --- | --- | --- |
| 000 | (Nonuse) | (Nonuse) |
| 001 | 4-input NAND-gate circuit | +15% |
| 010 | 3-input NAND-gate circuit | +10% |
| 011 | 2-input NAND-gate circuit | +5% |
| 100 | Inverter circuit | ±0% |
| 101 | 2-input NOR-gate circuit | -5% |
| 110 | 3-input NOR-gate circuit | -10% |
| 111 | (Nonuse) | (Nonuse) |

F I G. 11

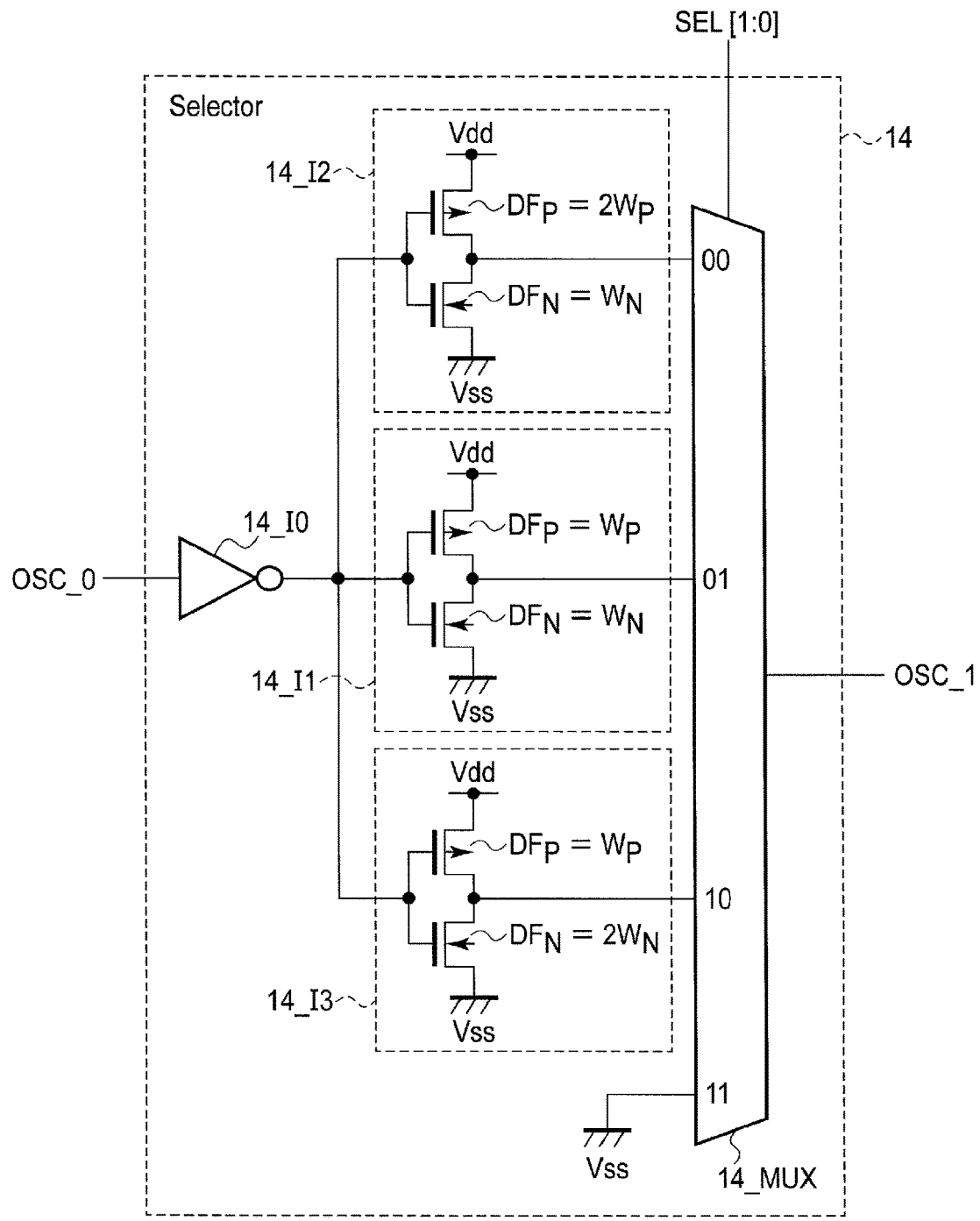
F I G. 12

| SEL [1:0] | Signal path | Duty ratio (Increase and decrease) |
|---|---|---|
| 00 | Inverter circuit ($DF_P > DF_N$) | +5% |
| 01 | Inverter circuit (Default: $DF_P = DF_N$) | ±0% |
| 10 | Inverter circuit ($DF_P < DF_N$) | -5% |
| 11 | (Nonuse) | (Nonuse) |
F I G. 13
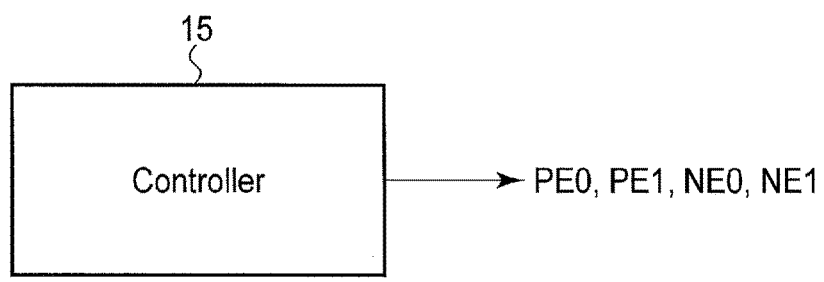
F I G. 14

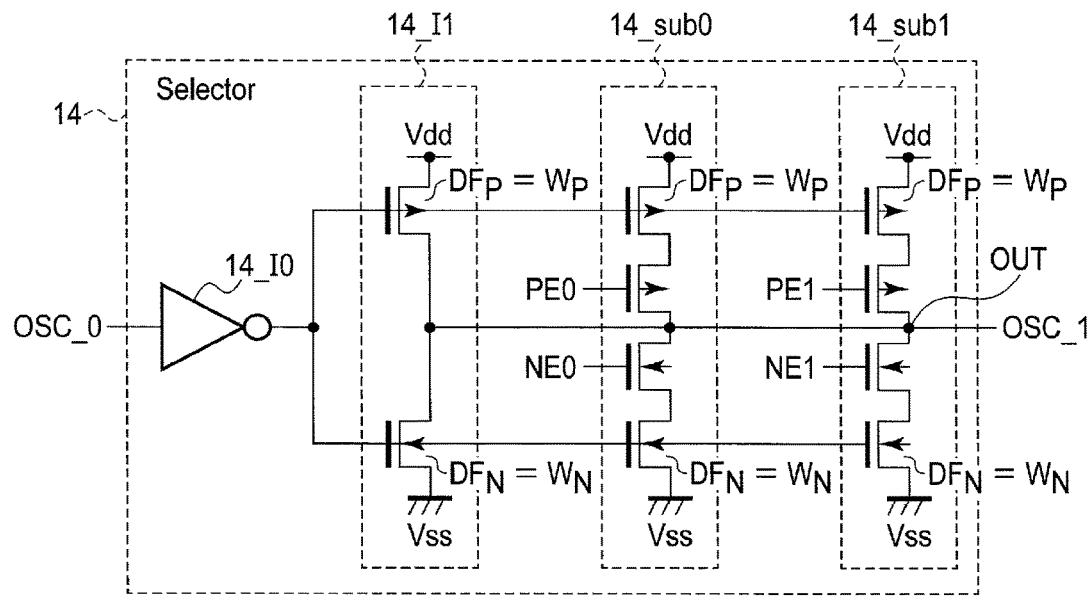
F I G. 15
| NE1 | NE0 | PE0 | PE1 | Driving force of inverter circuit 14_I1 | Duty ratio (Increase and decrease) |
|---|---|---|---|---|---|
| 0 | 0 | 0 | 0 | $DF_P = DF_N \times 3$ | +10% |
| 0 | 0 | 0 | 1 | $DF_P = DF_N \times 2$ | +5% |
| 0 | 0 | 1 | 1 | Default $DF_P = DF_N$ | ±0% |
| 0 | 1 | 1 | 1 | $DF_N = DF_P \times 2$ | -5% |
| 1 | 1 | 1 | 1 | $DF_N = DF_P \times 3$ | -10% |
F I G. 16

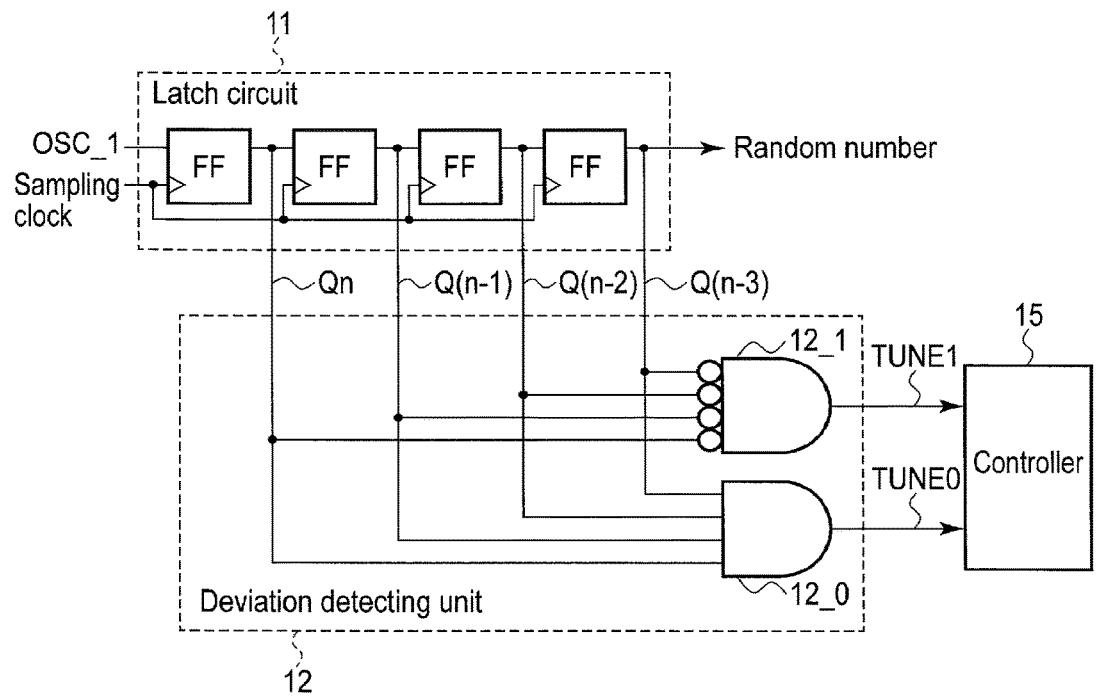
F I G. 17
| Qn | Q(n-1) | Q(n-2) | Q(n-3) | TUNE1 | TUNE0 |
|---|---|---|---|---|---|
| 0 | 0 | 0 | 0 | 1 | 0 |
| 1 | 1 | 1 | 1 | 0 | 1 |
| X | X | X | X | 0 | 0 |
XXXX shows the case that Qn, Q(n-1), Q(n-2) and Q(n-3) are not all 0 and are not all 1
F I G. 18

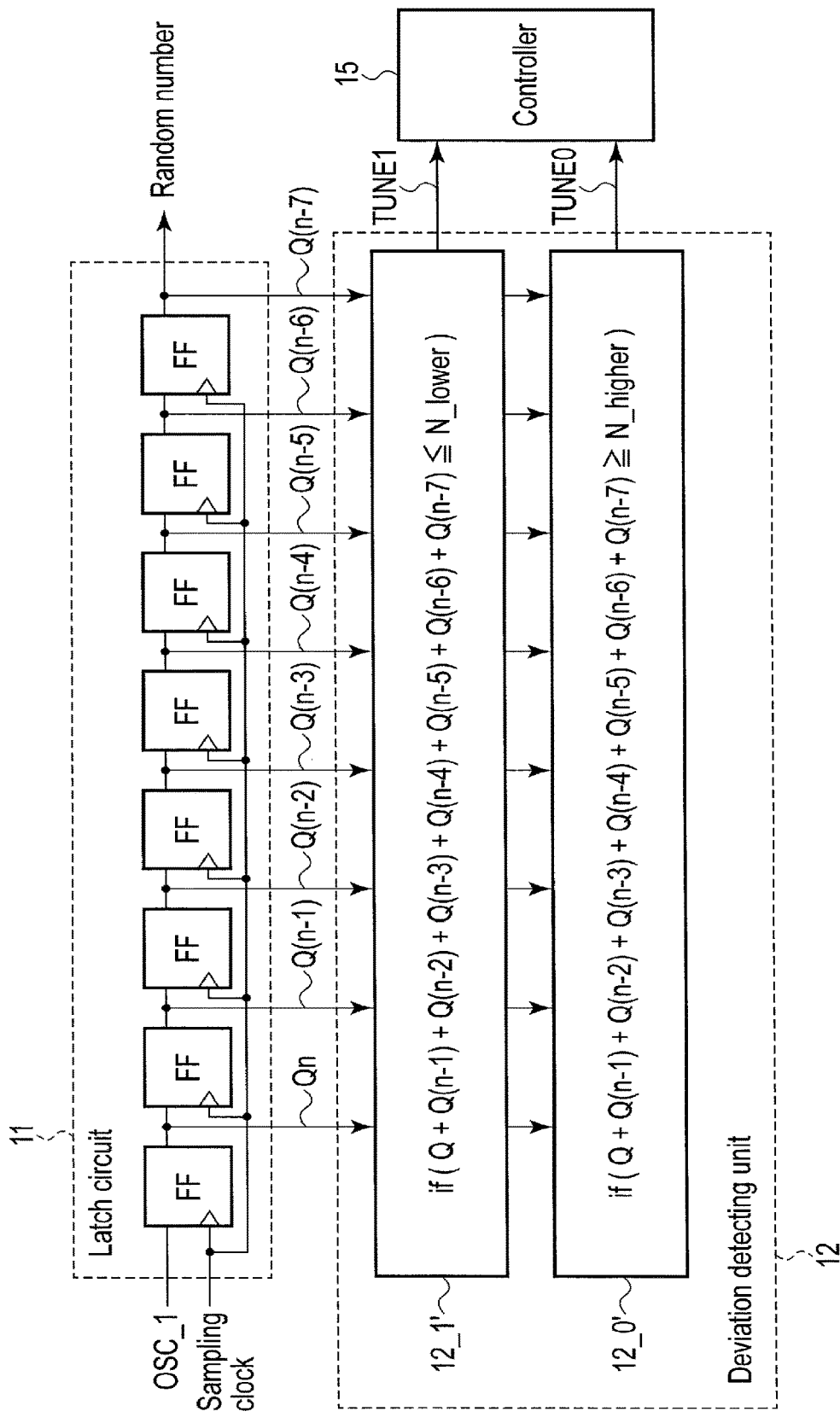
F I G. 19

| Total of number of 1<br>Total_1 | TUNE1 | TUNE0 |
|---|---|---|
| Total_1 ≦ N_lower | 1 | 0 |
| Total_1 ≧ N_higher | 0 | 1 |
| N_lower < Total_1 < N_higher | 0 | 0 |
F I G. 20
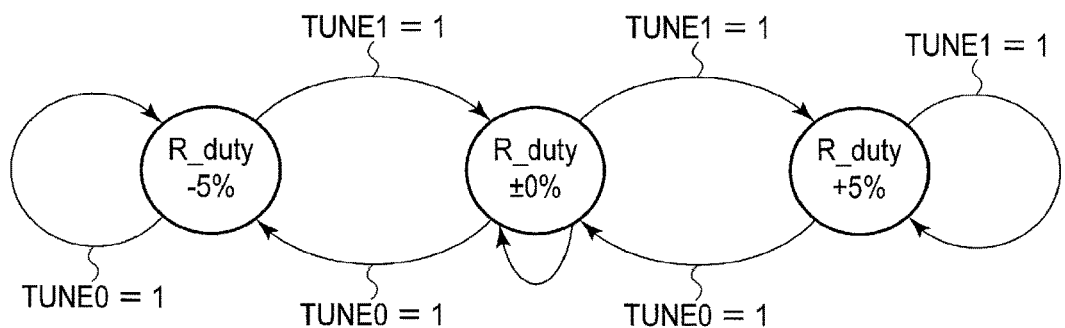
F I G. 21
| State | SEL [1:0] |
|---|---|
| R_duty +5% | 00 |
| R_duty ±0% | 01 |
| R_duty -5% | 10 |
F I G. 22

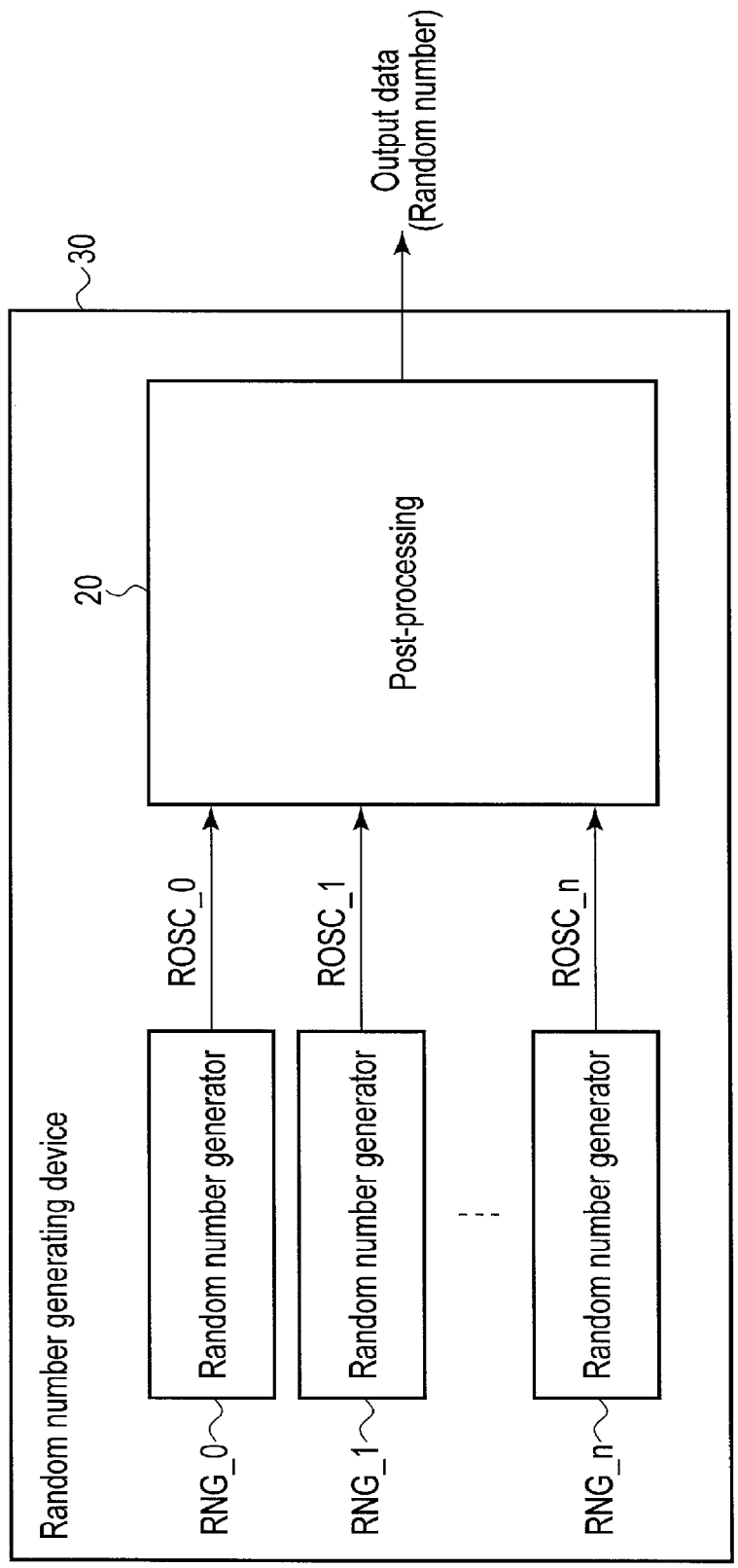
F I G. 23

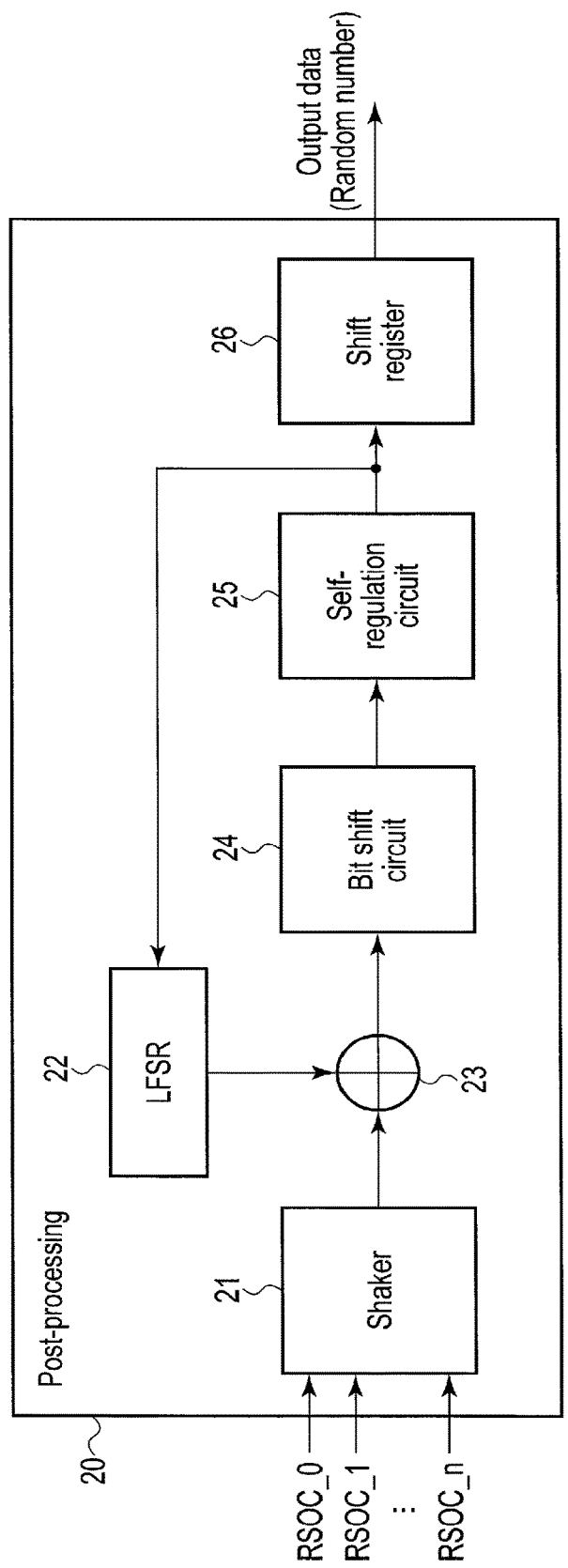
F I G. 24

RANDOM NUMBER GENERATOR

CROSS-REFERENCE TO RELATED APPLICATIONS

This application is based upon and claims the benefit of priority from Japanese Patent Application No. 2016-052320, filed Mar. 16, 2016, the entire contents of which are incorporated herein by reference.

FIELD

Embodiments described herein relate generally to a random number generator.

BACKGROUND

In accordance with the development of information and communications technology and popularization of credit cards and transportation system IC cards, security of an IC chip used in the above kinds of cards is valued. In order to protect information from malicious attackers, sufficient disorderliness, that is, entropy (randomness) is required for a random number for use in generating an encryption key or the like.

BRIEF DESCRIPTION OF THE DRAWINGS

FIG. 1 is a diagram showing an example of a random number generator.
FIG. 2 is a drawing showing the relationship between the duty ratio of an oscillation signal and the frequency of appearance of 0/1.
FIG. 3 is a table showing the frequency of appearance of 0/1 and the substance of process.
FIG. 4 is a drawing showing the relationship between the duty ratio of an oscillation signal and the frequency of appearance of 0/1.
FIG. 6 is a diagram showing a circuit example of the random number generator.
FIG. 10 is a diagram showing a second example of a selector.
FIG. 11 is a table showing the relationship among a selection signal, a signal path, and duty ratio (increase and decrease).
FIG. 12 is a diagram showing a third example of a selector.
FIG. 13 is a table showing the relationship among a selection signal, a signal path, and duty ratio (increase and decrease).
FIG. 14 is a diagram showing an example of a selection signal output from a controller.
FIG. 15 is a diagram showing a fourth example of a selector.
FIG. 16 is a table showing the relationship among a selection signal, the driving force of an inverter circuit, and duty ratio (increase and decrease).
FIG. 17 is a diagram showing a first example of a deviation detecting unit.
FIG. 18 is a table showing the relationship between the deviation of a random number and a control signal.
FIG. 19 is a diagram showing a second example of a deviation detecting unit.
FIG. 20 is a table showing the relationship between the deviation of a random number and a control signal.
FIG. 21 is a drawing showing an example of control of duty ratio performed by the controller.
FIG. 22 is a table showing the relationship between an increase/decrease of duty ratio and a selection signal.
FIG. 23 is a diagram showing an example of a random number generating device.
FIG. 24 is a diagram showing an example of a post-processing unit.

DETAILED DESCRIPTION

Figure 5:
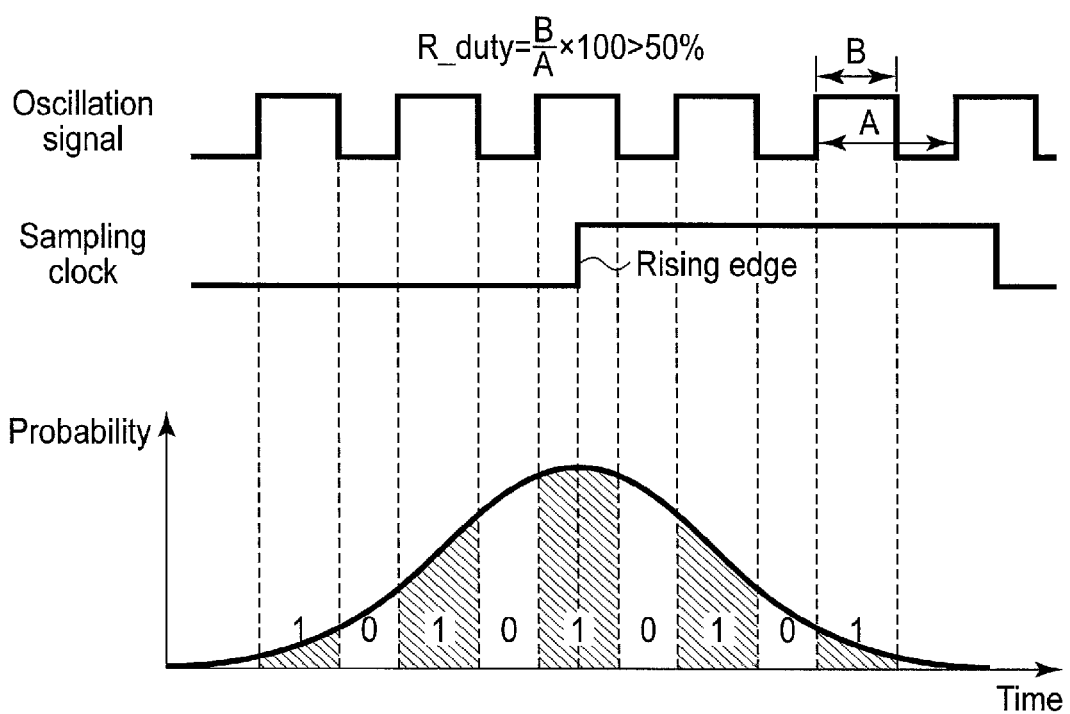
FIG. 5 is drawing showing the relationship between the duty ratio of an oscillation signal and the frequency of appearance of 0/1.

In general, according to one embodiment, a random number generator comprises: a first circuit which outputs a second oscillation signal having a predetermined duty ratio on the basis of a first oscillation signal; a second circuit which latches values on the basis of the second oscillation signal and a clock having a frequency lower than a frequency of the second oscillation signal; a third circuit which outputs a control signal on the basis of the values; and a fourth circuit which controls the first circuit on the basis of the control signal.

(Embodiment)

An embodiment of a random number generator (an entropy source generator) will be described with reference to the accompanying drawings. The random number generator is a circuit which generates a high-entropy random number (0 or 1) used in information security or the like.

There are mainly two ways of generating a random number as a method of generating a random number. One is to generate a random number in a pseudo way from some initial value by an algorithm. The other is to generate a random number based on a physical uncertainty factor that the random number generator has. Since the former method may output the same result when the initial value is the same, it is considered that the latter method can generate a random number having higher entropy as compared to the former method. Hence, the present embodiment is premised on the latter method.

In the latter method, the physical uncertainty factor can be obtained by, for example, latching an oscillation signal (0 or 1) from an oscillation circuit at the rising edge (0 to 1) or the falling edge (1 to 0) of a sampling clock having a sufficiently lower frequency than an oscillatory frequency of the oscillation signal.

For example, by inputting a high-frequency oscillation signal from the oscillation circuit (a ring oscillator) to a D-input terminal of a D-type flip-flop circuit, a metastable state in which 0 and 1 can both be latched by the D-type flip-flop circuit is created. In this case, when a low-frequency sampling clock is input to a C-input terminal, the value of the D-input terminal at the time of rising of the sampling clock is latched into the D-type flip-flop circuit, and is output to a Q-output terminal. That is, if the ratio of 0s to 1s which are input to the D-input terminal is half-and-half (1:1), the probability of 0 being latched into the D-type flip-flop circuit and the probability of 1 being latched into the same become fifty-fifty, and this yields the physical uncertainty factor.

However, the physical uncertainty factor is yielded also by elements such as an environmental element, i.e., the temperature, noise, etc., and a manufacturing element, i.e., the production tolerance of a device, etc., other than the relationship between the oscillatory frequency of the oscillation circuit and the frequency of the sampling clock. Further, such an environmental element or manufacturing element may trigger a deviation caused by the physical uncertainty factor that either one of 0 and 1 is favored, that is, either one of 0 and 1 is easily latched into the D-type flip-flop circuit, for example. If the above happens, a high-entropy random number (random data) cannot be created.

Hence, in the present embodiment, the technology of firstly, providing a deviation detecting unit which detects whether a deviation occurs by the physical uncertainty factor, secondly, feeding back this fact to the oscillation circuit when the deviation occurs by the physical uncertainty factor, and thirdly, performing a process of eliminating the deviation caused by the physical uncertainty factor in the oscillation circuit.

For example, as shown in FIG. 1, a random number generator which comprises an oscillation circuit 10, and a latch circuit 11 capable of latching an oscillation signal having a high frequency (100 MHz to 2 GHz, for example) which is output from the oscillation circuit 10 at a rising edge or a falling edge of a sampling clock having a low frequency (1 to 50 mega Hz, for example) is assumed. The oscillation circuit 10 is, for example, a ring oscillator, and the latch circuit 11 is, for example, a D-type flip-flop circuit.

In this case, if the duty ratio R_duty of the oscillation signal is 50%, the probability of an output signal of the latch circuit 11 being 0 is 50%, and the probability of an output signal of the latch circuit 11 being 1 is also 50%. Accordingly, high-entropy random data can be generated. However in the present embodiment, it is assumed that the duty ratio R_duty is the ratio between a period of one cycle of an oscillation signal and a period in which the oscillation signal is 1, that is, a value obtained by multiplying a value, which is derived by dividing the period in which the oscillation signal is 1 by the period of one cycle of the oscillation signal, by 100.

FIG. 2 shows the probability of the output signal of the latch circuit 11 being 0 or 1 when the duty ratio R_duty (=B/A×100) of the oscillation signal is 50%.

If it is supposed that the sampling clock is raised at the center of period w_1 in which the oscillation signal is 1, and the rising of the sampling clock has variations (jitter), the probability of the output signal of the latch circuit 11 being 0 or 1 conforms to a normal distribution. For example, when the sampling clock rises in period w_1 in which the oscillation signal is 1, the output signal of the latch circuit 11 is set to 1, and when the sampling clock rises in period w_0 in which the oscillation signal is 0, the output signal of the latch circuit 11 is set to 0.

In one sampling, a probability P1 of the latch circuit 11 latching 1 can be assumed as the sum of the area of shaded portions (i.e., portions 1) of the normal distribution, and the probability P0 of the latch circuit 11 latching 0 can be assumed as the sum of the area of outline portions (i.e., portions 0) of the normal distribution. Given that a phase of the oscillation signal and a phase of the sampling clock are constant, the area of the shaded portions (1) amount to 50% of the area of the whole normal distribution, and the area of the outline portions (0) amounts to 50% of the whole normal distribution.

Accordingly, if the duty ratio R_duty of the oscillation signal is 50%, the probability P1 of the latch circuit 11 latching 1 and the probability P0 of the latch circuit 11 latching 0 are 50% in both cases.

However, as described above, when a deviation occurs by the physical uncertainty factor, the probability P1 and the probability P0 do not become the same. That is, high-entropy random data cannot be generated. Hence, by using a deviation detecting unit 12, whether a deviation occurs by the physical uncertainty factor is detected in real time or at a predetermined time.

Whether or not a deviation occurs by the physical uncertainty factor can be determined by monitoring an output signal of the latch circuit 11, that is, monitoring the values of the random number (0 or 1).

For example, the deviation detecting unit 12 monitors a frequency of the output signal of the latch circuit 11 being 0 (a frequency of appearance of 0), a frequency of the output signal of the latch circuit 11 being 1 (a frequency of appearance of 1), or both of those frequencies. The deviation detecting unit 12 can determine that no deviation is caused by the physical uncertainty factor if the frequency of appearance 0 is the same as that of 1, or a difference between those frequencies of appearance falls within a certain range. Further, in cases other than the above, the deviation detecting unit 12 can determine that a deviation is caused by the physical uncertainty factor.

When the deviation detecting unit 12 determines that a deviation occurs by the physical uncertainty factor, this is fed back to the oscillation circuit 10. The oscillation circuit 10 performs a process of eliminating the deviation caused by the physical uncertainty factor based on the information from the deviation detecting unit 12.

For example, as shown in FIG. 3, when a frequency of appearance of 0, i.e., frequency of appearance f_0, is greater than a frequency of appearance of 1, i.e., frequency of appearance f_1 (f_0>f_1), the duty ratio R_duty (=B/A× 100) of the oscillation signal is considered to be less than 50% because of the environmental element or the manufacturing element, etc., as shown in FIG. 4. In this case, the oscillation circuit 10 performs a process of increasing the duty ratio R_duty of the oscillation signal.

Further, as shown in FIG. 3, when the frequency of appearance f_0 is the same as the frequency of appearance f_1 (f_0=f_1), the duty ratio R_duty (=B/A×100) of the oscillation signal is considered to be 50%, as shown in FIG. 2. In this case, the oscillation circuit 10 continues outputting the oscillation signal.

Furthermore, as shown in FIG. 3, when the frequency of appearance f_1 is greater than the frequency of appearance f_0 (f_0<f_1), the duty ratio R_duty (=B/A×100) of the oscillation signal is considered to be greater than 50% because of the environmental element or the manufacturing element, etc., as shown in FIG. 5. In this case, the oscillation circuit 10 performs a process of decreasing the duty ratio R_duty of the oscillation signal.

As can be seen, according to the present embodiment, by monitoring values of the random number (0 or 1), and controlling the duty ratio of the oscillation signal output by the oscillation circuit, it becomes possible to generate high-entropy random data.

(Circuit Example)

FIG. 6 shows a circuit example of the random number generator.

The latch circuit 11 latches a plurality of values (for example, four values), which are Qn, Q(n−1), Q(n−2), and Q(n−3), that constitute the random number from an oscillation signal OSC_1 based on the sampling clock. A frequency of the sampling clock is sufficiently lower than a frequency of the oscillation signal OSC_1. In this case, the latch circuit 11 comprises a plurality of (for example, four) latch portions 11n, 11(n−1), 11(n−2), and 11(n−3) which can latch the plurality of values Qn, Q(n−1), Q(n−2), and Q(n−3), for example.

Each of the latch portions 11n, 11(n−1), 11(n−2), and 11(n−3) is, for example, a D-type flip-flop circuit. Also, the plurality of latch portions 11n, 11(n−1), 11(n−2), and 11(n−3) are connected in series with each other.

For example, the oscillation signal OSC_1 is input to a D-input terminal of the latch portion 11n (hereinafter referred to as a first latch portion). A Q-output terminal of the first latch portion 11n is connected to a D-input terminal of the latch portion 11(n−1) (hereinafter referred to as a second latch portion). A Q-output terminal of the second latch portion 11(n−1) is connected to a D-input terminal of the latch portion 11(n−2) (hereinafter referred to as a third latch portion). A Q-output terminal of the third latch portion 11(n−2) is connected to a D-input terminal of the latch portion 11(n−3) (hereinafter referred to as a fourth latch portion). A random number is output from a Q-output terminal of the fourth latch portion 11(n−3). Also, a sampling clock is input to each of C-input terminals of the plurality of latch portions 11n, 11(n−1), 11(n−2), and 11(n−3).

A first value (0 or 1) is latched into the first latch portion 11n at a first rising edge of the sampling clock. A second value (0 or 1) is latched into the first latch portion 11n at a second rising edge of the sampling clock. At this time, the first value is latched into the second latch portion 11(n−1).

Similarly, a third value (0 or 1) is latched into the first latch portion 11n at a third rising edge of the sampling clock. At this time, the second value and the first value are latched into the second latch portion 11(n−1) and the third latch portion 11(n−2), respectively. Also, a fourth value (0 or 1) is latched into the first latch portion 11n at a fourth rising edge of the sampling clock. At this time, the third value, the second value, and the first value are latched into the second latch portion 11(n−1), the third latch portion 11(n−2), and the fourth latch portion 11(n−3), respectively.

The deviation detecting unit 12 monitors the number of 0s (the frequency of appearance of 0), the number of 1s (the frequency of appearance of 1), or both of those numbers, on the basis of the plurality of values Qn, Q(n−1), Q(n−2), and Q(n−3) latched into the latch circuit 11. If the number of 0s and the number of 1s are the same, for example, the deviation detecting unit 12 outputs control signals TUNE0 and TUNE1 showing that no deviation is caused by the physical uncertainty factor. Also, if the number of 0s and the number of 1s are different, for example, the deviation detecting unit 12 outputs control signals TUNE0 and TUNE1 showing that a deviation is caused by the physical uncertainty factor.

The control signals TUNE0 and TUNE1 are fed back to the oscillation circuit 10.

The oscillation circuit 10 comprises, for example, an oscillator 13 which generates an oscillation signal OSC_0, a controller 15 which outputs a selection signal SEL based on the control signals TUNE0 and TUNE1, and a selector 14 which changes the duty ratio R_duty of the oscillation signal OSC_0 based on the selection signal SEL and outputs an oscillation signal of the changed duty ratio R_duty as an oscillation signal OSC_1.

The oscillator 13 is, for example, a ring oscillator. The duty ratio R_duty of the oscillation signal OSC_0 generated from the oscillator 13 is changed by a deviation caused by the physical uncertainty factor related to the environmental element or manufacturing element, etc. The controller 15 controls a process of eliminating the deviation caused by the physical uncertainty factor based on the control signals TUNE0 and TUNE1.

For example, when the control signals TUNE0 and TUNE1 show that the number of 0s is more than (greater than) the number of 1s with respect to the plurality of values Qn, Q(n−1), Q(n−2), and Q(n−3) which constitute the random number, it is considered that the duty ratio R_duty of the oscillation signal OSC_0 is less than 50%. In this case, the controller 15 outputs a selection signal SEL which increases the duty ratio R_duty of the oscillation signal OSC_0.

Also, when the control signals TUNE0 and TUNE1 show that the number of 1s is more than (greater than) the number of 0s with respect to the plurality of values Qn, Q(n−1), Q(n−2), and Q(n−3) which constitute the random number, it is considered that the duty ratio R_duty of the oscillation signal OSC_0 is greater than 50%. In this case, the controller 15 outputs a selection signal SEL which decreases the duty ratio R_duty of the oscillation signal OSC_0.

The selector 14 comprises a plurality of options of changing or maintaining the duty ratio R_duty of the oscillation signal OSC_0. The selector 14 selects one of the plurality of options based on the selection signal SEL. The oscillation signal OSC_1 output from the selector 14 is an oscillation signal having a duty ratio R_duty equal to 50% or close to 50%.

(Selector)

An example of a selector within the random number generator shown in FIG. 6 will be described.

Figures 7, 9:
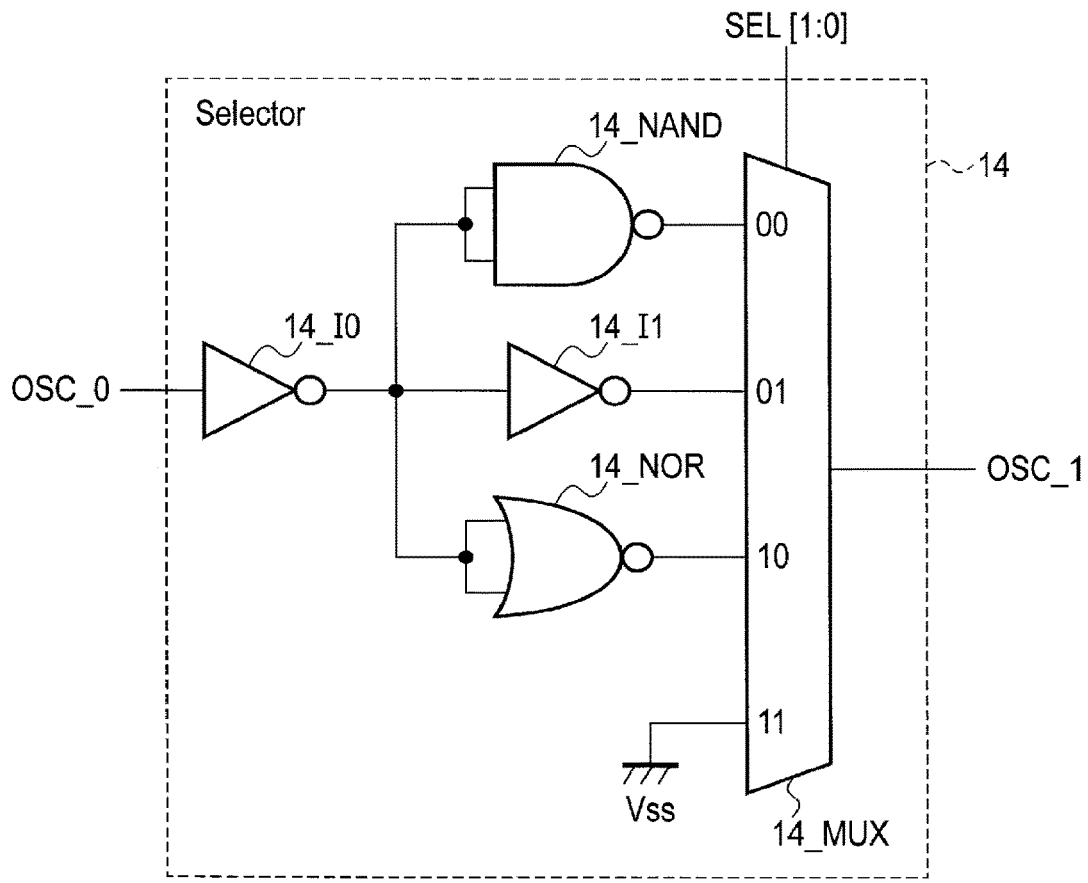
FIG. 7 is a diagram showing a first example of a selector.
FIG. 9 is a table showing the relationship among a selection signal, a signal path, and duty ratio (increase and decrease).

FIG. 7 shows a first example of the selector.

The selector 14 comprises an inverter circuit 14_I0 to which the oscillation signal OSC_0 is input and which outputs an inverted oscillation signal obtained by inverting a phase of the oscillation signal OSC_0, a NAND-gate circuit 14_NAND comprising a plurality of input terminals establishing common connection, an inverter circuit 14_I1 comprising a single input terminal, a NOR-gate circuit 14_NOR comprising a plurality of input terminals establishing common connection, and a multiplexer 14_MUX which selects an output signal to be output from the NAND-gate circuit 14_NAND, the inverter circuit 14_I1, and the NOR-gate circuit 14_NOR, and outputs the oscillation signal OSC_1.

The NAND-gate circuit 14_NAND, the inverter circuit 14_I1, and the NOR-gate circuit 14_NOR correspond to the plurality of options of changing or maintaining the duty ratio R_duty of the oscillation signal OSC_0, respectively.

The NAND-gate circuit 14_NAND is, for example, a 2-input NAND-gate circuit comprising two input terminals. Therefore, the inverted oscillation signal from the inverter circuit 14_I0 is input to the two input terminals of the NAND-gate circuit 14_NAND.

Figure 8:
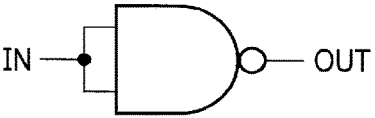
FIG. 8 is a diagram showing an example of each of a NAND-gate circuit, an inverter circuit, and a NOR-gate circuit.

The NAND-gate circuit 14_NAND comprises, for example, as shown in FIG. 8, two P-channel field effect transistors (FETs) which are connected in parallel between a power terminal Vdd and an output terminal OUT, and two N-channel FETs which are connected in series between the output terminal OUT and a power terminal Vss. Also, an input terminal IN is connected to gates of all the FETs. In this case, the NAND-gate circuit 14_NAND is equivalent to an inverter circuit in which a total of the driving forces (a channel width) of the P-channel FETs is larger than (greater than) a total of the driving forces (a channel width) of the N-channel FETs.

Accordingly, when the NAND-gate circuit 14_NAND is selected, the NAND-gate circuit 14_NAND tends to output 1 more than 0. This means that the duty ratio R_duty is increased (i.e., the phase of 1 is made longer). In other words, when it is assumed that the duty ratio R_duty of the oscillation signal OSC_0 is less than 50%, the NAND-gate circuit 14_NAND is selected, and a correction process of increasing the duty ratio R_duty is performed. As a result, the oscillation signal OSC_1 is changed to an oscillation signal having a duty ratio R_duty equal to 50% or close to 50%.

The inverter circuit 14_I1 comprises, for example, as shown in FIG. 8, one P-channel FET which is connected between the power terminal Vdd and the output terminal OUT, and one N-channel FET which is connected between the output terminal OUT and the power terminal Vss. In this case, the inverter circuit 14_I1 serves as an inverter circuit (a default) in which the driving force (a channel width) of the P-channel FET is equal to the driving force (a channel width) of the N-channel FET.

Accordingly, when the inverter circuit 14_I1 is selected, the inverter circuit 14_I1 directly outputs the signal which has been input as an output signal without changing its duty ratio R_duty. In other words, when the duty ratio R_duty of the oscillation signal OSC_0 is equal to 50% or close to 50%, the inverter circuit 14_I1 is selected, and the duty ratio R_duty is not changed.

The NOR-gate circuit 14_NOR is, for example, a 2-input NOR-gate circuit comprising two input terminals. Therefore, the inverted oscillation signal from the inverter circuit 14_I0 is input to the two input terminals of the NOR-gate circuit 14_NOR.

The NOR-gate circuit 14_NOR comprises, for example, as shown in FIG. 8, two P-channel FETs which are connected in series between the power terminal Vdd and the output terminal OUT, and two N-channel FETs which are connected in parallel between the output terminal OUT and the power terminal Vss. Also, an input terminal IN is connected to gates of all the FETs. In this case, the NOR-gate circuit 14_NOR is equivalent to an inverter circuit in which a total of the driving forces (a channel width) of the N-channel FETs is larger than (greater than) a total of the driving forces (a channel width) of the P-channel FETs.

Accordingly, when the NOR-gate circuit 14_NOR is selected, the NOR-gate circuit 14_NOR tends to output 0 more than 1. This means that the duty ratio R_duty is decreased (i.e., the phase of 0 is made longer). In other words, when it is assumed that the duty ratio R_duty of the oscillation signal OSC_0 is greater than 50%, the NOR-gate circuit 14_NOR is selected, and a correction process of decreasing the duty ratio R_duty is performed. As a result, the oscillation signal OSC_1 is changed to an oscillation signal having a duty ratio R_duty equal to 50% or close to 50%.

FIG. 9 shows the relationship among the selection signal, signal path, and duty ratio (increase and decrease) in the selector of FIG. 7.

As the selection signal, 2-bit data SEL[1:0], that is, data represented as SEL[1] and SEL[0], for example, can be used. The selection signal SEL[1:0] is input to the multiplexer 14_MUX shown in FIG. 7.

For example, when the selection signal SEL[1:0] is 00, the NAND-gate circuit 14_NAND is selected. The NAND-gate circuit 14_NAND is, for example, a 2-input NAND-gate circuit, and increases the duty ratio R_duty of the oscillation signal OSC_0 by 5%. The multiplexer 14_MUX outputs the output signal of the NAND-gate circuit 14_NAND as the oscillation signal OSC_1 when the selection signal SEL[1:0] is 00.

Also, when the selection signal SEL[1:0] is 01, the inverter circuit 14_I1 is selected. The inverter circuit 14_I1 does not change the duty ratio R_duty of the oscillation signal OSC_0 (±0%). The multiplexer 14_MUX outputs the output signal of the inverter circuit 14_I1 as the oscillation signal OSC_1, when the selection signal SEL[1:0] is 01.

Further, when the selection signal SEL[1:0] is 10, the NOR-gate circuit 14_NOR is selected. The NOR-gate circuit 14_NOR is, for example, a 2-input NOR-gate circuit, and decreases the duty ratio R_duty of the oscillation signal OSC_0 by 5%. The multiplexer 14_MUX outputs the output signal of the NOR-gate circuit 14_NOR as the oscillation signal OSC_1 when the selection signal SEL[1:0] is 10.

In the examples illustrated in FIGS. 7, 8, and 9, although three options are shown as the options which change the duty ratio R_duty, the number of options can be changed. Generally, the greater the number of options is, the more precisely the duty ratio R_duty can be controlled. However, in this case, the circuit size of the selector 14 is increased.

Accordingly, an optimum number of options can be selected with reference to the entropy required by a system, a floor plan of a chip on which the random number generator is formed, etc.

FIG. 10 shows a second example of the selector.

The second example corresponds to a case where six options are provided as the options of changing the duty ratio R_duty.

The selector 14 comprises the inverter circuit 14_I0 to which the oscillation signal OSC_0 is input and which outputs the inverted oscillation signal obtained by inverting the phase of the oscillation signal OSC_0.

The selector 14 comprises, as the six options, a NAND-gate circuit 14_NAND0 comprising two input terminals establishing common connection, a NAND-gate circuit 14_NAND1 comprising three input terminals establishing common connection, a NAND-gate circuit 14_NAND2 comprising four input terminals establishing common connection, the inverter circuit 14_I1 comprising a single input terminal, a NOR-gate circuit 14_NOR0 comprising two input terminals establishing common connection, and a NOR-gate circuit 14_NOR1 comprising three input terminals establishing common connection.

The selector 14 further comprises the multiplexer 14_MUX which selects an output signal to be output from the three NAND-gate circuits, i.e., the NAND-gate circuits 14_NAND0, 14_NAND1, and 14_NAND2, the inverter circuit 14_I1, and the two NOR-gate circuits, i.e., the NOR-gate circuits 14_NOR0 and NOR1, and outputs the oscillation signal OSC_1.

Since an example of a circuit of each of the three NAND-gate circuits, i.e., the NAND-gate circuits 14_NAND0, 14_NAND1, and 14_NAND2, the inverter circuit 14_I1, and the two NOR-gate circuits, i.e., the NOR-gate circuits 14_NOR0 and NOR1, can easily be inferred from the first example (the circuit example shown in FIG. 8), the circuits of the second example will not be described here.

FIG. 11 shows the relationship among the selection signal, signal path, and duty ratio (increase and decrease) in the selector of FIG. 10.

As the selection signal, 3-bit data SEL[2:0], that is, data represented as SEL[2], SEL[1], and SEL[0], for example, can be used. The selection signal SEL[2:0] is input to the multiplexer 14_MUX of FIG. 10.

For example, when the selection signal SEL[2:0] is 001, the NAND-gate circuit 14_NAND2 is selected. The NAND-gate circuit 14_NAND2 is, for example, a 4-input NAND-gate circuit, and increases the duty ratio R_duty of the oscillation signal OSC_0 by 15%. The multiplexer 14_MUX outputs the output signal of the NAND-gate circuit 14_NAND2 as the oscillation signal OSC_1 when the selection signal SEL[2:0] is 001.

When the selection signal SEL[2:0] is 010, the NAND-gate circuit 14_NAND1 is selected. The NAND-gate circuit 14_NAND1 is, for example, a 3-input NAND-gate circuit, and increases the duty ratio R_duty of the oscillation signal OSC_0 by 10%. The multiplexer 14_MUX outputs the output signal of the NAND-gate circuit 14_NAND1 as the oscillation signal OSC_1 when the selection signal SEL[2:0] is 010.

When the selection signal SEL[2:0] is 011, the NAND-gate circuit 14_NAND0 is selected. The NAND-gate circuit 14_NAND0 is, for example, a 2-input NAND-gate circuit, and increases the duty ratio R_duty of the oscillation signal OSC_0 by 5%. The multiplexer 14_MUX outputs the output signal of the NAND-gate circuit 14_NAND0 as the oscillation signal OSC_1 when the selection signal SEL[2:0] is 011.

When the selection signal SEL[2:0] is 100, the inverter circuit 14_I1 is selected. The inverter circuit 14_I1 does not change the duty ratio R_duty of the oscillation signal OSC_0 (±0%). The multiplexer 14_MUX outputs the output signal of the inverter circuit 14_I1 as the oscillation signal OSC_1, when the selection signal SEL[2:0] is 100.

When the selection signal SEL[2:0] is 101, the NOR-gate circuit 14_NOR0 is selected. The NOR-gate circuit 14_NOR0 is, for example, a 2-input NOR-gate circuit, and decreases the duty ratio R_duty of the oscillation signal OSC_0 by 5%. The multiplexer 14_MUX outputs the output signal of the NOR-gate circuit 14_NOR0 as the oscillation signal OSC_1 when the selection signal SEL[2:0] is 101.

When the selection signal SEL[2:0] is 110, the NOR-gate circuit 14_NOR1 is selected. The NOR-gate circuit 14_NOR1 is, for example, a 3-input NOR-gate circuit, and decreases the duty ratio R_duty of the oscillation signal OSC_0 by 10%. The multiplexer 14_MUX outputs the output signal of the NOR-gate circuit 14_NOR1 as the oscillation signal OSC_1 when the selection signal SEL[2:0] is 110.

FIG. 12 shows a third example of the selector.

The third example corresponds to a case where the first example (FIGS. 7 to 9) is modified such that the 2-input NAND-gate circuit is replaced by an inverter circuit 14_I2 in which a driving force (channel width) $DF_P$ of a P-channel FET is double the driving force (channel width) $DF_N$ of an N-channel FET, and the 2-input NOR-gate circuit is replaced by an inverter circuit 14_I3 in which a driving force (channel width) $DF_N$ of an N-channel FET is double the driving force (channel width) $DF_P$ of a P-channel FET. However, it is assumed that a channel width $W_P$ of the P-channel FET is equal to a channel width $W_N$ of the N-channel FET.

The inverter circuit 14_I2 comprises the P-channel FET in which the driving force (channel width) satisfies the relationship of $DF_P=2W_P$, and the N-channel FET in which the driving force (channel width) satisfies the relationship of $DF_N=W_N$. The P-channel FET may be a single transistor whose channel width is $2W_P$, or may be formed by connecting two transistors each having the channel width of $W_P$ in parallel.

The inverter circuit 14_I3 comprises the P-channel FET in which the driving force (channel width) satisfies the relationship of $DF_P=W_P$, and the N-channel FET in which the driving force (channel width) satisfies the relationship of $DF_N=2W_N$. The N-channel FET may be a single transistor whose channel width is $2W_N$, or may be formed by connecting two transistors each having the channel width of $W_N$ in parallel.

Since the two inverter circuits, i.e., the inverter circuits 14_I0 and 14_I1, are the same as those of the first example, these inverter circuits will not be described here.

FIG. 13 shows the relationship among the selection signal, signal path, and duty ratio (increase and decrease) in the selector of FIG. 12.

As the selection signal, 2-bit data SEL[1:0], that is, data represented as SEL[1] and SEL[0], for example, can be used. The selection signal SEL[1:0] is input to the multiplexer 14_MUX shown in FIG. 12.

For example, when the selection signal SEL[1:0] is 00, the inverter circuit 14_I2 is selected. In the inverter circuit 14_I2, since the driving force $DF_P$ of the P-channel FET is greater than the driving force $DF_N$ of the N-channel FET, the duty ratio R_duty of the oscillation signal OSC_0 is increased by 5%. The multiplexer 14_MUX outputs the output signal of the inverter circuit 14_I2 as the oscillation signal OSC_1, when the selection signal SEL[1:0] is 00.

Also, when the selection signal SEL[1:0] is 01, the inverter circuit (default) 14_I1 is selected. The inverter circuit 14_I1 does not change the duty ratio R_duty of the oscillation signal OSC_0 (±0%). The multiplexer 14_MUX outputs the output signal of the inverter circuit 14_I1 as the oscillation signal OSC_1, when the selection signal SEL[1:0] is 01.

Further, when the selection signal SEL[1:0] is 10, the inverter circuit 14_I3 is selected. In the inverter circuit 14_I3, since the driving force $DF_N$ of the N-channel FET is greater than the driving force $DF_P$ of the P-channel FET, the duty ratio R_duty of the oscillation signal OSC_0 is decreased by 5%. The multiplexer 14_MUX outputs the output signal of the inverter circuit 14_I13 as the oscillation signal OSC_1, when the selection signal SEL[1:0] is 10.

Note that in the first example of the selector (FIGS. 7 to 9), the second example (FIGS. 10 and 11), and the third example (FIGS. 12 and 13), a gate circuit which disconnects unselected options from the output terminal of the inverter circuit 14_I0 may be added. In this case, since the unselected options can be brought into a non-operating state, it is effective in achieving low power consumption.

FIG. 15 shows a fourth example of the selector.

The fourth example corresponds to a case where the first example (FIGS. 7 to 9) is modified such that the inverter circuits 14_I0 and 14_I1 as buffer circuits are always selected, the multiplexer is omitted, and subsidiary circuits 14_sub0 and 14_sub1, which are capable of substantially changing the driving force (channel width) of the P-channel FET or the driving force (channel width) of the N-channel FET of the inverter circuit 14_I1, are newly added.

In this example, as selection signals of the selector 14, PE0, PE1, NE0, and NE1 are used. Accordingly, as shown in FIG. 14, the controller 15 outputs the selection signals PE0, PE1, NE0, and NE1.

The subsidiary circuit 14_sub0 comprises two P-channel FETs which are connected in series between the power terminal Vdd and the output terminal OUT, and two N-channel FETs which are connected in series between the output terminal OUT and the power terminal Vss. The inverted oscillation signal from the inverter circuit 14_I0 is input to each of a gate terminal of one of the two P-channel FETs and a gate terminal of one of the two N-channel FETs. The selection signal PE0 is input to the other one of the gate terminals of the two P-channel FETs, and the selection signal NE0 is input to the other one of the gate terminals of the two N-channel FETs.

Similarly, the subsidiary circuit 14_sub1 comprises two P-channel FETs which are connected in series between the power terminal Vdd and the output terminal OUT, and two N-channel FETs which are connected in series between the output terminal OUT and the power terminal Vss. The inverted oscillation signal from the inverter circuit 14_I0 is input to each of a gate terminal of one of the two P-channel FETs and a gate terminal of one of the two N-channel FETs. The selection signal PE1 is input to the other one of the gate terminals of the two P-channel FETs, and the selection signal NE1 is input to the other one of the gate terminals of the two N-channel FETs.

Driving force (channel width) $DF_P$ of the P-channel FET within the inverter circuit 14_I1, driving force (channel width) $DF_P$ of the two P-channel FETs within the subsidiary circuit 14_sub0, and driving force (channel width) $DF_P$ of the two P-channel FETs within the subsidiary circuit 14_sub1 are, for example, equal to each other, and equal to $W_P$. Also, driving force (channel width) $DF_N$ of the N-channel FET within the inverter circuit 14_I1, driving force (channel width) $DF_N$ of the two N-channel FETs within the subsidiary circuit 14_sub0, and driving force (channel width) $DF_N$ of the two N-channel FETs within the subsidiary circuit 14_sub1 are, for example, equal to each other, and equal to $W_N$. Further, channel width $W_P$ of the P-channel FET and channel width $W_N$ of the N-channel FET are, for example, equal to each other.

FIG. 16 shows the relationship among the selection signal, signal path, and duty ratio (increase and decrease) in the selector of FIG. 15.

For example, when the selection signals PE0 and PE1 are both 1, and the selection signals NE0 and NE1 are both 0, the two subsidiary circuits, i.e., subsidiary circuits 14_sub0 and 14_sub1, are both in a non-operating state. In this case, since the driving force $DF_P$ ($=W_P$) of the P-channel FET and the driving force $DF_N(=W_N)$ of the N-channel FET within the inverter circuit 14_I1 are equal to each other, the duty ratio R_duty of the oscillation signal OSC_0 is not changed, and the oscillation signal OSC_0 is output as the oscillation signal OSC_1 (±0%).

When the selection signal PE1 is 1, and the selection signals PE0, NE0, and NE1 are 0, in the subsidiary circuit 14_sub0, the P-channel FET into which the selection signal PE0 is input is brought into an on state. Further, the subsidiary circuit 14_sub1 is in an non-operating state. In this case, the driving force $DF_P$ of the P-channel FET within the inverter circuit 14_I1 becomes substantially $2W_P$. That is, the driving force $DF_P$ of the P-channel FET within the inverter circuit 14_I1 turns out to be double the driving force $DF_N$ of the N-channel FET within the inverter circuit 14_I1.

Accordingly, the selector 14 increases the duty ratio R_duty of the oscillation signal OSC_0 by 5%, and outputs such a signal as the oscillation signal OSC_1.

When the selection signals PE0, PE1, NE0, and NE1 are all 0, in the two subsidiary circuits, i.e., subsidiary circuits 14_sub0 and 14_sub1, the two P-channel FETs into which the selection signals PE0 and PE1 are input are brought into on states, respectively. In this case, the driving force $DF_P$ of the P-channel FET within the inverter circuit 14_I1 becomes substantially $3W_P$. That is, the driving force $DF_P$ of the P-channel FET within the inverter circuit 14_I1 turns out to be three times the driving force $DF_N$ of the N-channel FET within the inverter circuit 14_I1.

Accordingly, the selector 14 increases the duty ratio R_duty of the oscillation signal OSC_0 by 10%, and outputs such a signal as the oscillation signal OSC_1.

When the selection signals PE0, PE1, and NE0 are 1, and the selection signal NE1 is 0, in the subsidiary circuit 14_sub0, the N-channel FET into which the selection signal NE0 is input is brought into an on state. Further, the subsidiary circuit 14_sub1 is in an non-operating state. In this case, the driving force $DF_N$ of the N-channel FET within the inverter circuit 14_I1 becomes substantially $2W_N$. That is, the driving force $DF_N$ of the N-channel FET within the inverter circuit 14_I1 turns out to be double the driving force $DF_P$ of the P-channel FET within the inverter circuit 14_I1.

Accordingly, the selector 14 decreases the duty ratio R_duty of the oscillation signal OSC_0 by 5%, and outputs such a signal as the oscillation signal OSC_1.

When the selection signals PE0, PE1, NE0, and NE1 are all 1, in the two subsidiary circuits, i.e., subsidiary circuits 14_sub0 and 14_sub1, the two N-channel FETs into which the selection signals NE0 and NE1 are input are brought into on states, respectively. In this case, the driving force $DF_N$ of the N-channel FET within the inverter circuit 14_I1 becomes substantially $3W_N$. That is, the driving force $DF_N$ of the N-channel FET within the inverter circuit 14_I1 turns out to be three times the driving force $DF_P$ of the P-channel FET within the inverter circuit 14_I1.

Accordingly, the selector 14 decreases the duty ratio R_duty of the oscillation signal OSC_0 by 10%, and outputs such a signal as the oscillation signal OSC_1.

(Deviation Detecting Unit)

An example of the deviation detecting unit within the random number generator illustrated in FIG. 6 will be described.

FIG. 17 shows a first example of the deviation detecting unit.

The deviation detecting unit 12 comprises an AND circuit 12_0 in which the plurality of values Qn, Q(n−1), Q(n−2), and Q(n−3) that constitute the random number are input and which outputs the control signal TUNE0, and an AND circuit 12_1 in which an inverted signal of the plurality of values Qn, Q(n−1), Q(n−2), and Q(n−3) is input and which outputs the control signal TUNE1. The control signals TUNE0 and TUNE1 are input to the controller 15.

In this case, for example, as shown in FIG. 18, when all of the values Qn, Q(n−1), Q(n−2), and Q(n−3) that constitute the random number are 0, the control signal TUNE1 is set to 1.

All of the values Qn, Q(n−1), Q(n−2), and Q(n−3) being 0 means that the frequency of appearance of 0 is high. From the fact that the frequency of appearance of 0 is high, it is considered that the duty ratio R_duty of the oscillation signal is less than 50%. Accordingly, as an instruction of increasing the duty ratio R_duty of the oscillation signal, the deviation detecting unit 12 outputs the control signal TUNE1 (=1).

Also, for example, as shown in FIG. 18, when all of the values Qn, Q(n−1), Q(n−2), and Q(n−3) that constitute the random number are 1, the control signal TUNE0 is set to 1.

All of the values Qn, Q(n−1), Q(n−2), and Q(n−3) being 1 means that the frequency of appearance of 1 is high. From the fact that the frequency of appearance of 1 is high, it is considered that the duty ratio R_duty of the oscillation signal is greater than 50%. Accordingly, as an instruction of decreasing the duty ratio R_duty of the oscillation signal, the deviation detecting unit 12 outputs the control signal TUNE0(=1).

Further, when the values Qn, Q(n−1), Q(n−2), and Q(n−3) are not all 0 and are not all 1, the two control signals, i.e., the control signals TUNE0 and TUNE1, are both set to 0.

In this example, when the values Qn, Q(n−1), Q(n−2), and Q(n−3) are not all 0 and are not all 1, it is determined that there is no great deviation in generation of the random number (0 or 1), and the duty ratio R_duty of the oscillation signal at that time is maintained as it is.

FIG. 19 shows a second example of the deviation detecting unit.

The second example corresponds to a case where the control signals TUNE0 and TUNE1 are determined based on a judgment of whether the number of 1s is less than or equal to a threshold (the lower limit) N_lower, and whether the number of 1s is greater than or equal to a threshold (the upper limit) N_higher with respect to the values Qn, Q(n−1), Q(n−2) . . . , Q(n−7) that constitute the random number. Although the number of 1s is targeted in this example, the number of 0s may be targeted instead.

The deviation detecting unit 12 comprises a logic circuit 12_0' in which the values Qn, Q(n−1), Q(n−2), Q(n−3) . . . , Q(n−7) that constitute the random number are input and which outputs the control signal TUNE0, and a logic circuit 12_1' in which the values Qn, Q(n−1), Q(n−2), and Q(n−3) . . . , Q(n−7) are input and which outputs the control signal TUNE1. The control signals TUNE0 and TUNE1 are input to the controller 15.

In this case, for example, as shown in FIG. 20, when the logic circuit 12_1' determines that a total of the number of 1s, which will be referred to as Total_1, is less than or equal to the threshold N_lower (for example, 1) with respect to the values Qn, Q(n−1), Q(n−2), Q(n−3) . . . , Q(n−7) that constitute the random number, the logic circuit 12_1' sets the control signal TUNE1 to 1.

With respect to the values Qn, Q(n−1), Q(n−2), Q(n−3) . . . , Q(n−7), the fact that Total_1, which is the total of the number of 1s, is less than or equal to the threshold N_lower means that the frequency of appearance of 0s is high. From the fact that the frequency of appearance of 0 is high, it is considered that the duty ratio R_duty of the oscillation signal is less than 50%. Accordingly, as an instruction of increasing the duty ratio R_duty of the oscillation signal, the deviation detecting unit 12 outputs the control signal TUNE1 (=1).

Also, for example, as shown in FIG. 20, when the logic circuit 12_0' determines that Total_1, which is the total of the number of 1s, is greater than or equal to the threshold N_higher (for example, 7) with respect to the values Qn, Q(n−1), Q(n−2), Q(n−3) . . . , Q(n−7) that constitute the random number, the logic circuit 12_0' sets the control signal TUNE0 to 1.

With respect to the values Qn, Q(n−1), Q(n−2), Q(n−3) . . . , Q(n−7), the fact that Total_1, which is the total of the number of 1s, is greater than or equal to the threshold N_higher means that the frequency of appearance of 1s is high. From the fact that the frequency of appearance of 1 is high, it is considered that the duty ratio R_duty of the oscillation signal is greater than 50%. Accordingly, as an instruction of decreasing the duty ratio R_duty of the oscillation signal, the deviation detecting unit 12 outputs the control signal TUNE0(=1).

In this example, with respect to the values Qn, Q(n−1), Q(n−2), Q(n−3) . . . , Q(n−7), if Total_1, which is the total of the number of 1s, satisfies the relationship of N_lower<Total_1<N_higher, it is determined that there is no great deviation in generation of the random number (0 or 1), and the duty ratio R_duty of the oscillation signal at that time is maintained as it is. That is, the control signals TUNE0 and TUNE1 are both set to 0.

(Controller)

FIG. 21 shows an example of control of the duty ratio performed by a controller. FIG. 22 shows the state of the selection signal in the example of control in FIG. 21.

The controller corresponds to the controller 15 of FIGS. 6, 14, 17, and 19. The controller controls increasing and decreasing of the duty ratio R_duty of the oscillation signal based on the control signals TUNE0 and TUNE1 output from the deviation detecting unit.

For example, when the control signal TUNE1 is indicated as 1 (i.e., the frequency of appearance of 0 is high), the controller outputs the selection signal SEL[1:0] represented as 00, which increases the duty ratio R_duty of the oscillation signal by 5%.

Also, in a state where the duty ratio R_duty is increased by 5%, if the control signal TUNE1 is further indicated as 1, the controller outputs a selection signal of further increasing the duty ratio R_duty of the oscillation signal, or a selection signal of maintaining this state (i.e., the state in which duty ratio has been increased by 5%). Which selection signal is to be selected depends on the number of options within the selector. For example, when the selector shown in FIG. 7 or FIG. 12 is adopted, the number of options is three.

Accordingly, as shown in FIGS. 21 and 22, in the state where the duty ratio R_duty is increased by 5%, if the control signal TUNE1 is further indicated as 1, the controller outputs the selection signal SEL[1:0] represented as 00, which maintains the increased duty ratio of 5% as the duty ratio R_duty of the oscillation signal.

Further, in the state where the duty ratio R_duty is increased by 5%, also when the control signals TUNE0 and TUNE1 are both indicated as 0, the controller outputs the selection signal SEL[1:0] represented as 00, which maintains the increased duty ratio of 5% as the duty ratio R_duty of the oscillation signal.

Furthermore, in the state where the duty ratio R_duty is increased by 5%, if the control signal TUNE0 is indicated as 1, the controller outputs a selection signal SEL[1:0] represented as 01, which decreases the duty ratio R_duty of the oscillation signal, more specifically, resets the increasing of the duty ratio R_duty to 0%. In a state where the increasing and decreasing of the duty ratio R_duty is ±0%, when the control signals TUNE0 and TUNE1 are both indicated as 0, the controller outputs the selection signal SEL[1:0] represented as 01, which maintains the state in which the increasing and decreasing of the duty ratio R_duty of the oscillation signal is ±0%.

Also, in the state where the increasing and decreasing of the duty ratio R_duty is ±0%, when the control signal TUNE0 is indicated as 1, the controller outputs the selection signal SEL[1:0] represented as 10, which decreases the duty ratio R_duty of the oscillation signal by 5%. In a state where the duty ratio R_duty is decreased by 5%, when the control signal TUNE0 is further indicated as 1, and when the control signals TUNE0 and TUNE1 are both indicated as 0, the controller outputs the selection signal SEL[1:0] represented as 10, which maintains the decreased duty ratio of 5% as the duty ratio R_duty of the oscillation signal.

Further, in the state where the duty ratio R_duty is decreased by 5%, if the control signal TUNE1 is indicated as 1, the controller outputs a selection signal SEL[1:0] represented as 01, which increases the duty ratio R_duty of the oscillation signal, more specifically, resets the decreasing of the duty ratio R_duty to 0%.

(Random Number Generating Device)

An example of a random number generating device using the above-described random number generator will be described.

FIG. 23 shows an example of the random number generating device.

A random number generating device 30 comprises a plurality of random number generators RNG_0, RNG_1, . . . , RNG_n (where n is a natural number greater than or equal to 2), and a post-processing unit in which output signals ROSC_0, ROSC1, . . . , ROSC_n of the plurality of random number generators RNG_0, RNG_1, . . . , RNG_n are input and which outputs a random number.

Each of the random number generators RNG_0, RNG_1, . . . , RNG_n is the random number generator described above. The post-processing unit 20 is a circuit for further adding logical processing to the output signals (the random number) ROSC_0, ROSC1, . . . , ROSC_n from the plurality of random number generators RNG_0, RNG_1, . . . , RNG_n, and generating a higher-entropy random number.

The post-processing unit 20 comprises, for example, as shown in FIG. 24, a shaker 21, a linear feedback shift register (LFSR) 22, an adder 23, a bit shift circuit 24, a self-regulation circuit 25, and a shift register 26.

The shaker 21 randomly selects the output signals ROSC_0, ROSC1, . . . , ROSC_n, and combines the selected outputs signals with each other by a stirring function, and outputs a plurality of bits. The LFSR 22 is a circuit which removes periodicity of the output data (random number) and realizes higher entropy by feeding back a plurality of bits that are output from the self-regulation circuit 25. The adder 23 adds the plurality of bits output from the shaker 21 and the plurality of bits output from the LFSR22.

The bit shift circuit 24 shifts a plurality of bits which are output from the adder 23, and outputs the shifted bits to the self-regulation circuit 25. The self-regulation circuit 25 is a circuit which performs a process of equalizing the frequency of appearance of 0/1 with respect to the plurality of bits output from the bit shift circuit 24, and outputs a plurality of bits in which the frequency of appearance of 0/1 is equalized. The shift register 26 outputs a final random number based on the plurality of bits output from the self-regulation circuit 25.

(System)

An example of a system using the above random number generator will now be described.

Figure 25:
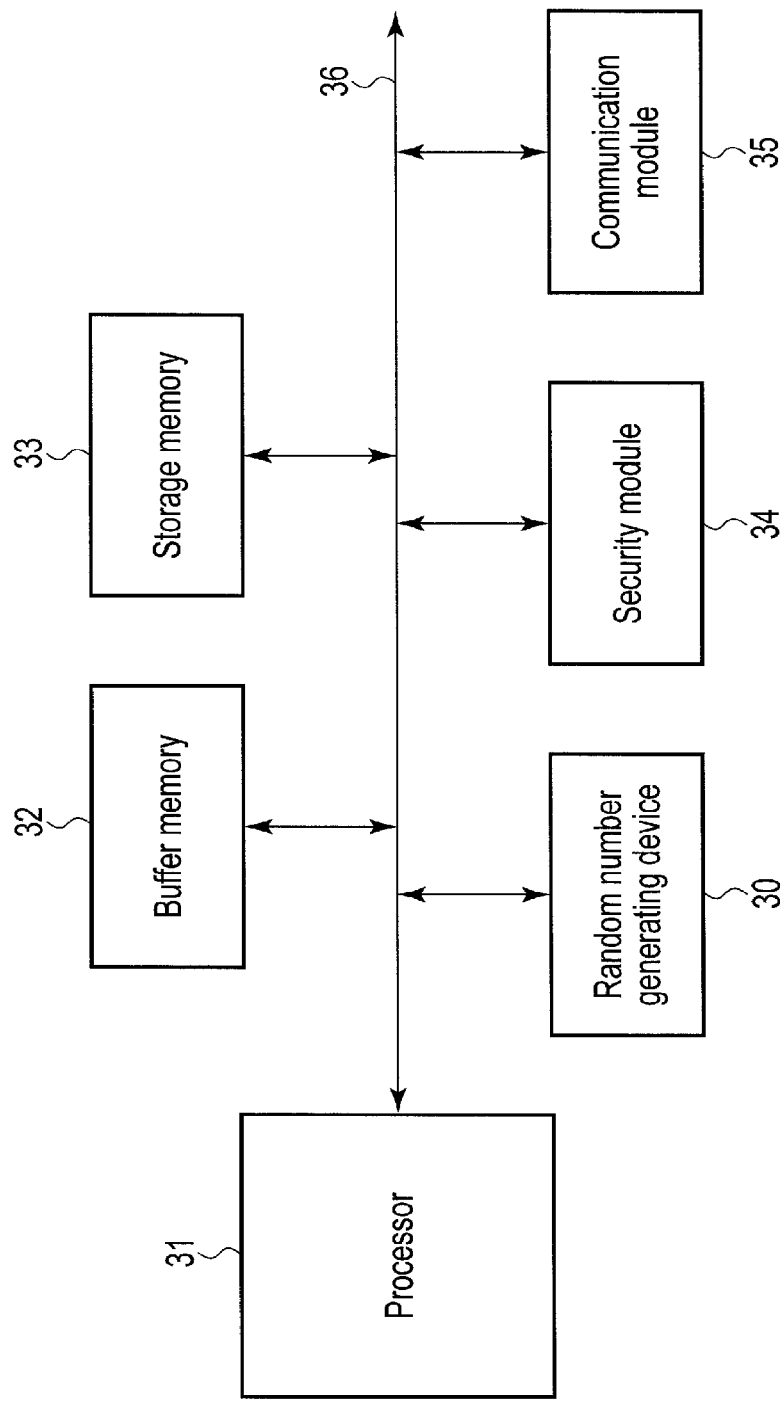
FIG. 25 is a diagram showing an example of a system.

FIG. 25 shows an example of the system.

This system is applied to a system where high security is required in information communication such as radio communication, that is, a system which is mounted in a credit card or a IC card, for example.

A processor 31 controls data transfer in information communication, for example. A buffer memory 32 is a volatile memory such as a random access memory (RAM), and temporarily stores data. A storage memory 33 is a nonvolatile memory such as a NAND flash memory, and stores firmware.

A security module 34 generates, for example, an encryption key used in encryption of data in information communication, and encrypts/decrypts the data. The random number generating device 30 outputs, for example, a random number used in generation of the encryption key. The random number generating device 30 is, for example, the random number generating device illustrated in FIG. 23. A communication module 35 controls transmission/reception of the data in information communication, for example.

A system bus 36 connects the random number generating device 30, the processor 31, the buffer memory 32, the storage memory 33, the security module 34, and the communication module 35 with each other.

CONCLUSION

As described above, according to the present embodiment, by controlling the duty ratio of the oscillation signal output by the oscillation circuit, a high-entropy random number (random data) can be generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A random number generator comprising:
    a first circuit which outputs a second oscillation signal having a predetermined duty ratio on the basis of a first oscillation signal;
    a second circuit which latches values on the basis of the second oscillation signal and a clock having a frequency lower than a frequency of the second oscillation signal;
    a third circuit which outputs a control signal on the basis of the values; and
    a fourth circuit which controls the first circuit on the basis of the control signal so as to increase the predetermined duty ratio when the predetermined duty ratio is less than 50% and to decrease the predetermined duty ratio when the predetermined duty ratio is greater than 50%,
    wherein the first circuit includes a first sub-circuit functioning as an inverter circuit and a second sub-circuit functioning as an inverter circuit,
    the first sub-circuit includes a first P-channel FET circuit portion including at least one P-channel FET and a first N-channel FET circuit portion including at least one N-channel FET and connected in series to the first P-channel FET circuit portion, a driving force of the first P-channel FET circuit portion being greater than that of the first N-channel FET circuit portion,
    the second sub-circuit includes a second P-channel FET circuit portion including at least one P-channel FET and a second N-channel FET circuit portion including at least one N-channel FET and connected in series to the second P-channel FET circuit portion, a driving force of the second N-channel FET circuit portion being greater than that of the second P-channel FET circuit portion, and
    the predetermined duty ratio is increased by selecting one of the first and second sub-circuits, and the predetermined duty ratio is decreased by selecting the other one of the first and second sub-circuits.

2. The random number generator of claim 1, further comprising a fifth circuit which generates the first oscillation signal.

3. The random number generator of claim 2, wherein the fifth circuit comprises a ring oscillator.

4. The random number generator of claim 1, wherein
the second circuit comprises latch portions connected in series, and
the values are latched in the latch portions, respectively.

5. The random number generator of claim 1, wherein the second circuit latches the values on the basis of a rising edge or a falling edge of the clock.

6. The random number generator of claim 5, wherein the second circuit comprises a flip-flop circuit.

7. The random number generator of claim 1, wherein each of the values includes 0 or 1.

8. The random number generator of claim 7, wherein the third circuit outputs the control signal showing a relationship between a number of 0s and a number of 1s on the basis of the values.

9. The random number generator of claim 8, wherein the third circuit outputs the control signal showing that the number of 0s is larger than the number of 1s, and the predetermined duty ratio is larger than a duty ratio of the first oscillation signal.

10. The random number generator of claim 8, wherein the third circuit outputs the control signal showing that the number of 1s is larger than the number of 0s, and the predetermined duty ratio is smaller than a duty ratio of the first oscillation signal.

11. The random number generator of claim 1, wherein the frequency of the second oscillation signal has a value between 100 mega Hz and 2 giga Hz, and the frequency of the clock has a value between 1 mega Hz and 50 mega Hz.

12. The random number generator of claim 1, wherein the first circuit further includes a third sub-circuit functioning as an inverter circuit, and
the third sub-circuit includes a third P-channel FET circuit portion including at least one P-channel FET and a third N-channel FET circuit portion including at least one N-channel FET and connected in series to the third P-channel FET circuit portion, a driving force of the third P-channel FET circuit portion being equal to that of the third N-channel FET circuit portion.

13. The random number generator of claim 12, wherein the first sub-circuit includes a NAND-gate circuit which includes the first P-channel FET circuit portion and the first N-channel FET circuit portion, and the second sub-circuit includes a NOR-gate circuit which includes the second P-channel FET circuit portion and the second N-channel FET circuit portion.

14. The random number generator of claim 12, wherein the first sub-circuit includes a first inverter circuit which includes a first P-channel FET and a first N-channel FET, a driving force of the first P-channel FET being greater than that of the first N-channel FET, and
the second sub-circuit includes a second inverter circuit which includes a second P-channel FET and a second N-channel FET, a driving force of the second N-channel FET being greater than that of the second P-channel FET.

15. A random number generating device comprising:
random number generators each comprising:
a first circuit which outputs a second oscillation signal having a predetermined duty ratio on the basis of a first oscillation signal;
a second circuit which latches values on the basis of the second oscillation signal and a clock having a frequency lower than a frequency of the second oscillation signal;
a third circuit which outputs a control signal on the basis of the values;
a fourth circuit which controls the first circuit on the basis of the control signal so as to increase the predetermined duty ratio when the predetermined duty ratio is less than 50% and to decrease the predetermined duty ratio when the predetermined duty ratio is greater than 50%; and
a post-processing unit which performs logical processing of output signals from the random number generators and outputs a random number,
wherein the first circuit includes a first sub-circuit functioning as an inverter circuit and a second sub-circuit functioning as an inverter circuit,
the first sub-circuit includes a first P-channel FET circuit portion including at least one P-channel FET and a first N-channel FET circuit portion including at least one N-channel FET and connected in series to the first P-channel FET circuit portion, a driving force of the first P-channel FET circuit portion being greater than that of the first N-channel FET circuit portion,
the second sub-circuit includes a second P-channel FET circuit portion including at least one P-channel FET and a second N-channel FET circuit portion including at least one N-channel FET and connected in series to the second P-channel FET circuit portion, a driving force of the second N-channel FET circuit portion being greater than that of the second P-channel FET circuit portion, and
the predetermined duty ratio is increased by selecting one of the first and second sub-circuits, and the predetermined duty ratio is decreased by selecting the other one of the first and second sub-circuits.

16. A system comprising:
a random number generating comprising:
random number generators each comprising:
a first circuit which outputs a second oscillation signal having a predetermined duty ratio on the basis of a first oscillation signal;
a second circuit which latches values on the basis of the second oscillation signal and a clock having a frequency lower than a frequency of the second oscillation signal;
a third circuit which outputs a control signal on the basis of the values; and
a fourth circuit which controls the first circuit on the basis of the control signal so as to increase the predetermined duty ratio when the predetermined duty ratio is less than 50% and to decrease the predetermined duty ratio when the predetermined duty ratio is greater than 50%;
a post-processing unit which performs logical processing of output signals from the random number generators and outputs a random number;
a security module which generates an encryption key using the random number from the random number generating device and encrypts/decrypts data; and
a communication module which transmits/receives the data,
wherein the first circuit includes a first sub-circuit functioning as an inverter circuit and a second sub-circuit functioning as an inverter circuit,
the first sub-circuit includes a first P-channel FET circuit portion including at least one P-channel FET and a first N-channel FET circuit portion including at least one N-channel FET and connected in series to the first P-channel FET circuit portion, a driving force of the first P-channel FET circuit portion being greater than that of the first N-channel FET circuit portion, the second sub-circuit includes a second P-channel FET circuit portion including at least one P-channel FET and a second N-channel FET circuit portion including at least one N-channel FET and connected in series to the second P-channel FET circuit portion, a driving force of the second N-channel FET circuit portion being greater than that of the second P-channel FET circuit portion, and the predetermined duty ratio is increased by selecting one of the first and second sub-circuits, and the predetermined duty ratio is decreased by selecting the other one of the first and second sub-circuits.

* * * * *